United States Patent
Nigam et al.

(10) Patent No.: US 11,316,574 B2
(45) Date of Patent: *Apr. 26, 2022

(54) METHOD AND APPARATUS FOR MEASURING AND REPORTING BEAMS IN A BEAMFORMING BASED SYSTEM

(71) Applicant: Samsung Electronics Co., Ltd., Suwon-si (KR)

(72) Inventors: Anshuman Nigam, Bangalore (IN); Jungsoo Jung, Seongnam-si (KR); Sunheui Ryoo, Yongin-si (KR); Jungmin Moon, Suwon-si (KR); Sungjin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,094

(22) Filed: Oct. 19, 2020

(65) Prior Publication Data
US 2021/0036751 A1 Feb. 4, 2021

Related U.S. Application Data

(63) Continuation of application No. 16/686,603, filed on Nov. 18, 2019, now Pat. No. 10,812,165, which is a (Continued)

(30) Foreign Application Priority Data

Jul. 31, 2014 (KR) .................. 10-2014-0098580

(51) Int. Cl.
*H04B 7/06* (2006.01)
*H04W 16/28* (2009.01)

(52) U.S. Cl.
CPC .......... *H04B 7/063* (2013.01); *H04B 7/0634* (2013.01); *H04W 16/28* (2013.01)

(58) Field of Classification Search
CPC ...... H04B 7/063; H04B 7/0634; H04W 16/28
(Continued)

(56) References Cited

U.S. PATENT DOCUMENTS

| 7,482,975 B2 | 1/2009 | Kimata |
| 10,122,432 B2* | 11/2018 | Nigam ................. H04B 7/0634 |

(Continued)

FOREIGN PATENT DOCUMENTS

| CN | 101816147 A | 8/2010 |
| CN | 101904109 A | 12/2010 |

(Continued)

OTHER PUBLICATIONS

Chinese Office Action with English translation dated Jun. 26, 2019; Chinese Appln. No. 201580041332.7.
(Continued)

*Primary Examiner* — Michael R Neff
(74) *Attorney, Agent, or Firm* — Jefferson IP Law, LLP

(57) ABSTRACT

The present disclosure relates to a pre-5th-Generation (5G) or 5G communication system to be provided for supporting higher data rates Beyond 4th-Generation (4G) communication system such as Long Term Evolution (LTE). Disclosed is a method of reporting beam measurement state information by a User Equipment (UE). The method may include: measuring beam state information by using a first reception chain and a second reception chain; controlling beam state information on the first reception chain to correspond to beam state information on the second reception chain; calculating state information on each beam based on the controlled beam state information on the first reception chain and beam state information on the second reception (Continued)

chain; and reporting state information on one or more beams.

20 Claims, 13 Drawing Sheets

Related U.S. Application Data continuation of application No. 16/180,423, filed on Nov. 5, 2018, now Pat. No. 10,484,071, which is a continuation of application No. 15/329,439, filed as application No. PCT/KR2015/008046 on Jul. 31, 2015, now Pat. No. 10,122,432.

(58) Field of Classification Search
USPC .......................................................... 375/267
See application file for complete search history.

(56) References Cited

U.S. PATENT DOCUMENTS

| 10,484,071 | B2* | 11/2019 | Nigam ................... H04B 7/063 |
| 2003/0133524 | A1 | 7/2003 | Miller et al. |
| 2009/0069054 | A1 | 3/2009 | Zangi et al. |
| 2009/0160707 | A1 | 6/2009 | Lakkis |
| 2011/0026459 | A1 | 2/2011 | Tsai et al. |
| 2011/0090976 | A1 | 4/2011 | Kim et al. |
| 2013/0170573 | A1 | 7/2013 | Jalloul et al. |
| 2013/0235742 | A1 | 9/2013 | Josiam et al. |
| 2013/0267221 | A1 | 10/2013 | Srinivasan et al. |
| 2013/0301454 | A1 | 11/2013 | Seol et al. |
| 2014/0198681 | A1 | 7/2014 | Jung et al. |
| 2016/0337056 | A1 | 11/2016 | Frenne et al. |

FOREIGN PATENT DOCUMENTS

| CN | 102474311 A | 5/2012 |
| CN | 103188007 A | 7/2013 |
| KR | 10-2013-0103449 A | 9/2013 |
| KR | 10-2013-0127376 A | 11/2013 |

OTHER PUBLICATIONS

Korean Office Action with English translation dated Feb. 28, 2020; Korean Appln. No. 10-2014-0098580.

* cited by examiner

METHOD AND APPARATUS FOR MEASURING AND REPORTING BEAMS IN A BEAMFORMING BASED SYSTEM

CROSS-REFERENCE TO RELATED APPLICATION(S)

This application is a continuation application of prior Application Ser. No. 16/686,603, filed on Nov. 18, 2019, which is a continuation application of prior application Ser. No. 16/180,423, filed on Nov. 5, 2018, which has issued as U.S. Pat. No. 10,484,071 on Nov. 19, 2019, which was a continuation of prior application Ser. No. 15/329,439, filed on Jan. 26, 2017, which has issued as U.S. Pat. No. 10,122,432 on Nov. 6, 2018, which was a U.S. National Stage application under 35 U.S.C. § 371 of an International application filed on Jul. 31, 2015 and assigned application number PCT/KR2015/008046, which claimed the benefit of a Korean patent application filed on Jul. 31, 2014 in the Korean Intellectual Property Office and assigned Serial number 10-2014-0098580, the entire disclosure of each of which is hereby incorporated by reference.

TECHNICAL FIELD

The present invention relates generally to beam measurement in a communication system and an apparatus therefor. Further, the present invention relates to a method and an apparatus for measuring a beam in a beamforming system. In an exemplary a cell in a cellular system can be composed of one or more limited bandwidth beams instead of a typical single omni-directional beam.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands or 28 GHz bands or 38 Ghz bands, so as to accomplish higher data rates by utilizing the vast bandwidth available in these mmWave bands. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed and proposed to be used in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In a general cellular system, measurement samples are acquired during a predetermined period to exclude a shadow effect and a short-term fading effect, and then an average is calculated. Thereafter, in order to determine whether a predetermined event is satisfied, the average is compared with a preset threshold. For example, it is assumed that a measurement report is performed when a simple event, such as a measurement average of a serving cell equal to or smaller than a threshold, is configured. A User Equipment (UE) measures a configured measurement value to perform a proper average calculation process, and then compares whether the measured average of the serving cell is equal to or smaller than a preset threshold on every measurement period. When the measurement value of the serving cell is equal to or smaller than the preset threshold, the UE transmits a measurement report to an evolved NodeB (eNB). Based on the measurement report, the eNB may perform appropriate tasks such as allowing the UE to measure cells in frequencies different from that of the measurement cell of the current UE.

FIG. 1 illustrates a process for generally performing a measurement report procedure according to each layer. Referring to FIG. 1, layer 1 (physical layer) performs measurement at for eg. every 40 ms, calculates an average of values measured in every 200 ms, and reports the calculated average to layer 3. This is a general measurement result report procedure in the LTE system. Layer 3 compares a preset threshold and the reported average. Layer 3 performs a process of calculating an average of different times according to an averaging parameter set to calculate the final filtered value, which when a final filtered value meets the preset threshold triggers reporting of the measured value.

Alternatively, the same average value calculation process may be used. When the periodic measurement value report is configured, measurement values may be reported to the eNB.

A general layer 3 average calculation in LTE is performed based on an equation of $(1-a)*F_{n-1}+a*M_n$. In the equation, a denotes a filter coefficient, $M_n$ denotes an nth layer 1 average, and $F_{n-1}$ denotes an n−1th layer 3 average.

Various events, which can be configured in the LTE system, are shown in the below table.

| Event | 3GPP TS 36.331 |
| --- | --- |
| A1 | Serving > Threshold |
| A2 | Serving > Threshold |
| A3 | Neighbor > Pcell + Offset |
| A4 | Neighbor > Threshold |
| A5 | Pcell < Threshold |
| | Neighbor > Threshold 2 |
| A6 | Neighbor > Scell + Offset |

Cells, which meet a reference for reporting (meet preset thresholds) are arranged and reported in a descending order of measurement values later. A reporting configuration may be configured as the maximum number of cells, to which the report can be provided (for example, a general value is 8).

Measurement values in LTE may be received signal received power (RSRP) or received signal received quality (RSRQ).

Meanwhile, in a cellular system based on the millimeter wave, it is required to overcome a high propagation loss in order to actually operate the cellular communication system, so that beamforming is needed. For example, in order to operate a cellular system based on millimeter wave band up to a range of 200 meters, a beam width of about 10 degrees is required.

Further, the beamforming requires a method of measuring each beam, reporting a measurement result, and using the measurement result for selection of the best beam(s) for communication with the base station.

DISCLOSURE OF INVENTION

Technical Problem

An aspect of the present invention is to provide a method and an apparatus for measuring a cell in a communication system (for example, a beamforming system).

Solution to Problem

In accordance with an aspect of the present invention, a method of reporting beam measurement state information by a terminal is provided. The method includes: measuring beam state information on beams of at least one serving cell and beams of at least one neighbor cell; adjusting beam state information on at least one measured beam for normalizing the beam state information on the measured beam; calculating state information on each beam based on the adjusted beam state information; and reporting state information on one or more beams.

In accordance with another aspect of the present invention, a terminal for reporting beam measurement state information is provided. The apparatus includes: a transceiver configured to transmit and receive a signal; and at least one processor configured to: measure beam state information on beams of at least one serving cell and beams of at least one neighbor cell; adjust beam state information on at least one measured beam for normalizing the beam state information on the measured beam; calculate state information on each beam based on the adjusted beam state information; and report state information on one or more beams.

In accordance with another aspect of the present invention, a method of receiving beam state information by a base station is provided. The method includes: transmitting beam state information report configuration information to a terminal; and receiving beam state information from the terminal based on the beam state information report configuration information, wherein the beam state information is determined based on information, which is generated by adjusting beam state information measured by the terminal for normalizing.

In accordance with another aspect of the present invention, a base station for receiving state information is provided. The apparatus includes: a transceiver configured to transmit and receive a signal; and at least one processor configured to; transmit beam state information report configuration information to a terminal; and receive beam state information from the terminal based on the beam state information report configuration information, wherein the beam state information is determined based on information, which is generated by adjusting the beam state information measured by the terminal for normalizing.

Advantageous Effects of Invention

According to an embodiment of the present invention, it is possible to provide a method and an apparatus for efficiently measuring a cell in a communication system (for example, a beamforming system).

According to various embodiments, it is possible to provide a method of preventing a difference between a beam pair in beam selection. An embodiment of the present invention can provide a method of determining a cell priority based on a beam pair. Further, an embodiment of the present invention can provide a method of defining a reporting event for a beamforming system.

BRIEF DESCRIPTION OF DRAWINGS

The above and other objects, features and advantages of the present invention will be more apparent from the following detailed description in conjunction with the accompanying drawings, in which.

MODE FOR THE INVENTION

Figure 1:
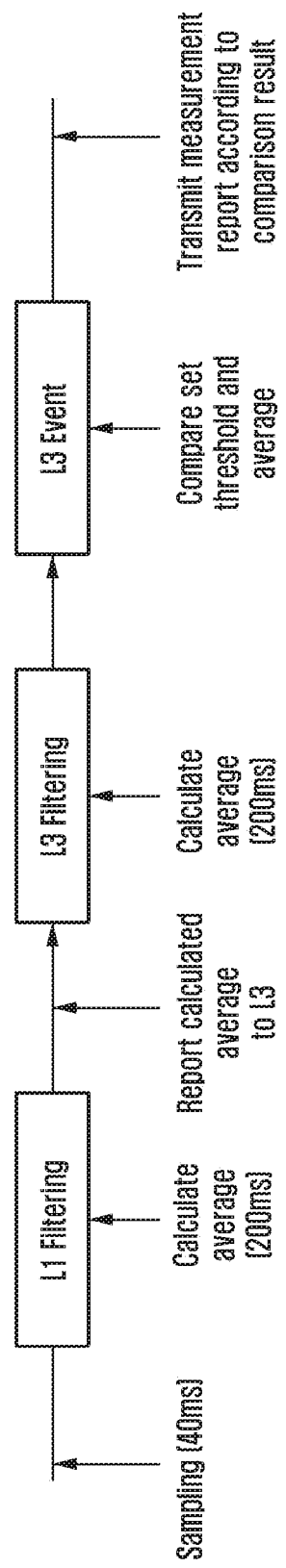
FIG. 1 illustrates a process for generally performing a measurement report procedure according to each layer.

Hereinafter, various embodiments will be described with reference to the accompanying drawings. It should be noted that the same elements will be designated by the same reference numerals although they are shown in different drawings. Further, a detailed description of a known function and configuration which may make the subject matter of the present invention unclear will be omitted. Hereinafter, it should be noted that only the descriptions will be provided that may help understanding the operations provided in association with the various embodiments of the present invention, and other descriptions will be omitted to avoid making the subject matter of the present invention rather unclear.

In embodiments of the present invention, measurement may be used as the same meaning as that of beam measurement, beam state measurement, or beaming channel state measurement. The beam state measurement may include a channel state between a transmission beam of an eNB and a reception beam of a UE or a state of a received signal intensity. A measurement report may be used as the same meaning as that of a beam measurement report, a beam state measurement report, or a beam channel state measurement report. A serving cell and a serving eNB may be used as the same meaning. A neighbor cell and a neighbor eNB may be used as the same meaning.

Figure 2:
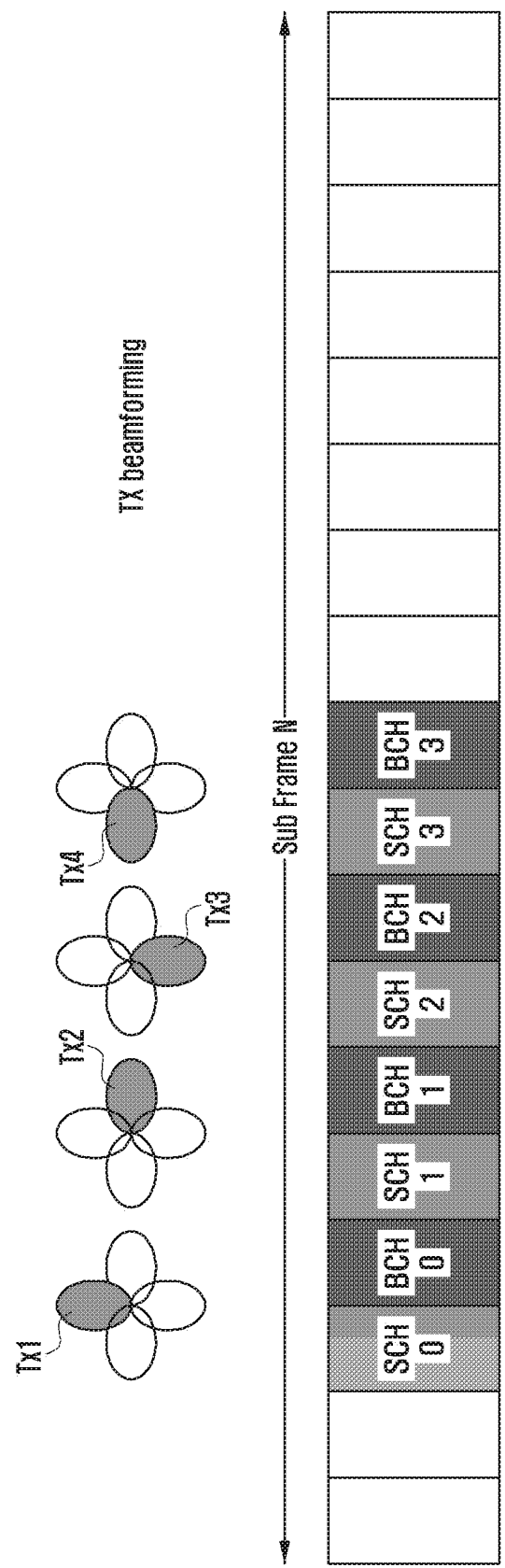
FIG. 2 illustrates a method of transmitting a signal by a transmitter in a beamforming system.

FIG. 2 illustrates a method of transmitting a signal by a transmitter in a beamforming system. Referring to FIG. 2, according to an embodiment of the beamforming system, the transmitter transmits a narrow beam in one direction in one time slot, and then rotates and transmits a beam in a next neighbor direction in a next time slot. Neighbor directions may be separated by a beam width. The beam transmitter may transmit control information and reference signals in each beam. For example, a general synchronization and broadcast channel (SCH/BCH) is transmitted every four subframes among five subframes. In each subframe, the SCH/BCH should be transmitted in each control beam direction. In a fifth subframe, a reference signal for supporting measurement is transmitted in each beam direction. The reference signal may be similar to a Cell-specific Reference Signal (CRS) of LTE.

Figure 3:
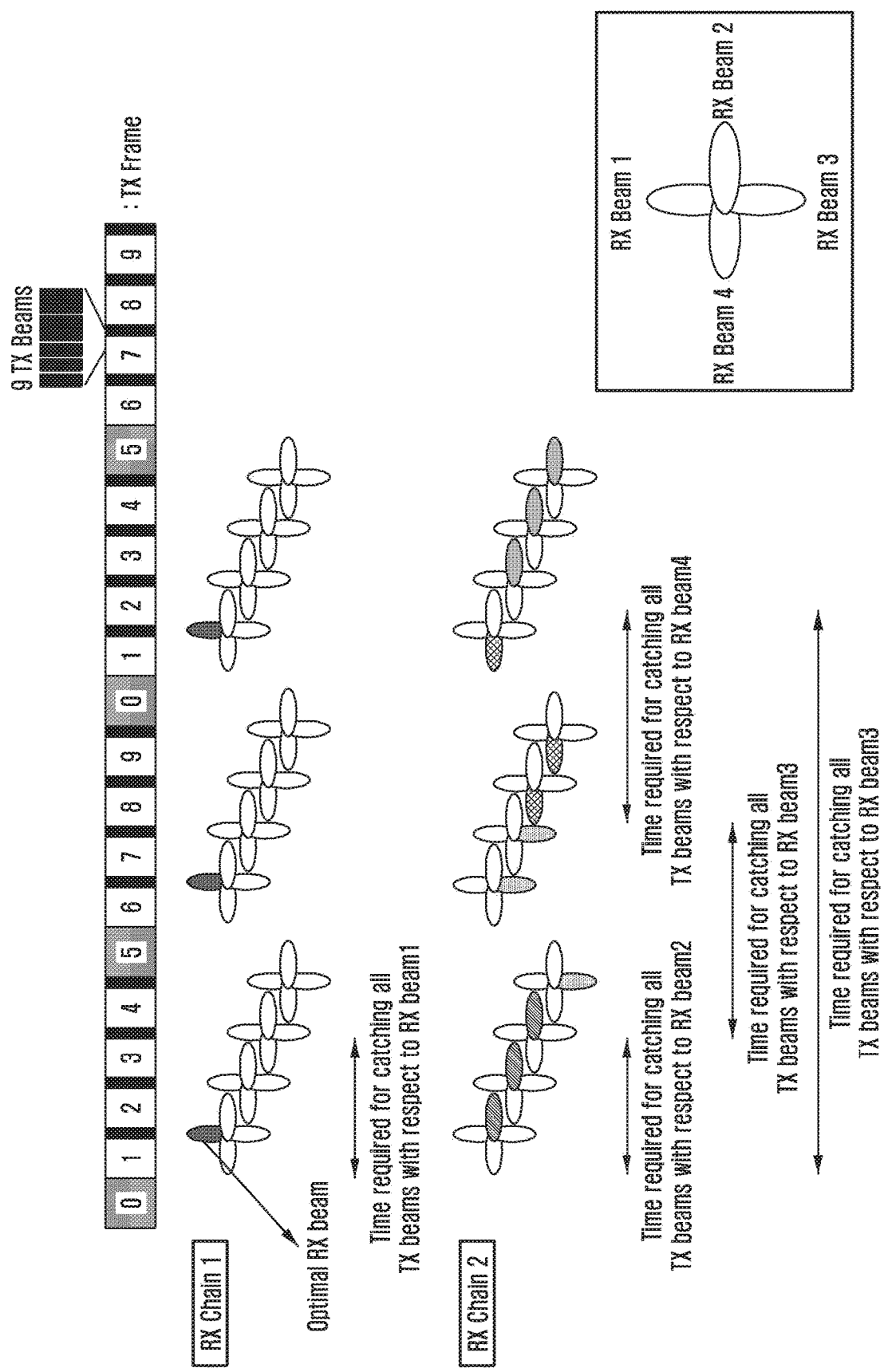
FIG. 3 illustrates a method of receiving a signal by a receiver in the beamforming system.

FIG. 3 illustrates a method of receiving a signal by a receiver in the beamforming system. Referring to FIG. 3, beamforming may be used to obtain a reception antenna gain by the receiver. In general, the number of RF chains of the receiver is limited in consideration of expense and complexity. For example, when the receiver has only one RF chain, the receiver adjusts an antenna in one direction at a time.

According to an embodiment of the present invention, the receiver may include at least two reception chains (RX chains). It is assumed that the number of RX chains is two in FIG. 3. A first RX chain may be used for receiving data from a serving cell. The first RX chain may use a beam having a best reception rate among a plurality of reception beams as a serving beam. The first RX chain may be selected based on a measurement result of each TX beam and RX beam. A second RX chain may be used for measuring a beam state of a beam pair corresponding to the transmission beam. The beam state measurement of the beam pair may include not only measurement of the serving cell but also measurement of the neighbor cell.

The receiver is required to acquire reception energy in all directions. For example, when a beam width of the receiver is 90 degrees, four slots are needed to acquire reception energy in all directions. In consideration of the beamforming system, acquiring one sample with respect to one pair of TX beam and RX beam takes time, which corresponds to a product of a time required for transmitting a beam in each direction by a transmitter and a time required for acquiring reception energy in all directions.

For example, a simple system, in which the transmitter transmits a beam including a Reference Signal (RS) used by the receiver for measurement in each slot (in one beam direction in one slot), is considered. The number of slots required for acquiring one sample with respect to each pair of TX beam and RX beam is Ntx*Nrx. Ntx denotes the number of TX beam directions and Nrx denotes the number RX beam directions. For example, when a TX beam width is 10 degrees, Ntx=36 to cover all omnidirectional spaces. When the RX beam width is 30 degrees, Nrx=12. In such a condition, in order to acquire one measurement sample with respect to each beam pair, 36*12=432 slots are required.

Since a millimeter wave is more susceptible to penetration/absorption, millimeter wave links are much more fragile compared to sub 3 GHz links. For example, when the millimeter wave penetrates a human body, the human body causes a loss of 20-35 dB. Similarly, materials such as concrete and leaves may cause a significant loss. In such a system, a good link recognized by the receiver based on signal power received from the corresponding link may be more quickly lost (compared to a general time scale of a measurement task). That is, although a beam having the good receiving sensibility is determined, the receiving sensibility may rapidly deteriorate due to a sudden loss. In order to solve the above problems, when one link is lost in the system configuration, a link having the good receiving sensibility between the network and the UE may be managed in advance to allow communication between other links to remain.

Continuous measurement for all beam pairs is required to evaluate durability of the link and identify the best link (TX and RX beam pair). However, when all pairs are measured only for a short time, it takes a considerably long time to acquire the desired number of samples in light of the high power of Ntx and Nrx used for the measurement. Further, when the beam states of all beam pairs are continuously measured, the following problems may occur.

Problem of a different number of measurement samples for each beam pair.

Based on the number of available RFs, one RF continuously focuses on a best serving beam pair. Other RFs should measure other beam pairs crossing over cells. In general, the number of RFs is highly likely to be smaller than the number of beam pairs to be measured. Accordingly, more samples can be acquired with respect to the best serving beam pair rather than other beam pairs. That is, although many samples can be acquired with respect to the beam pair (serving beam pair) for RX 1, relatively few samples can be acquired with respect to beam pairs for RX 2 compared to the serving beam pair in FIG. 3.

Problem of different measurement sample collection periods of beam pairs.

A time for collecting measurement samples for all beam pairs may be much longer than a general channel coherence time. If a system using millimeter communication considers deep and frequent shade (link vulnerability), the existing order samples cannot accurately reflect current channel conditions. That is, in L1, a time for calculating a measurement value average may be several times longer than the channel coherence time depending on Ntx and Nrx. This results in a problem of a method of standardizing samples within a sampling period.

Figure 4:
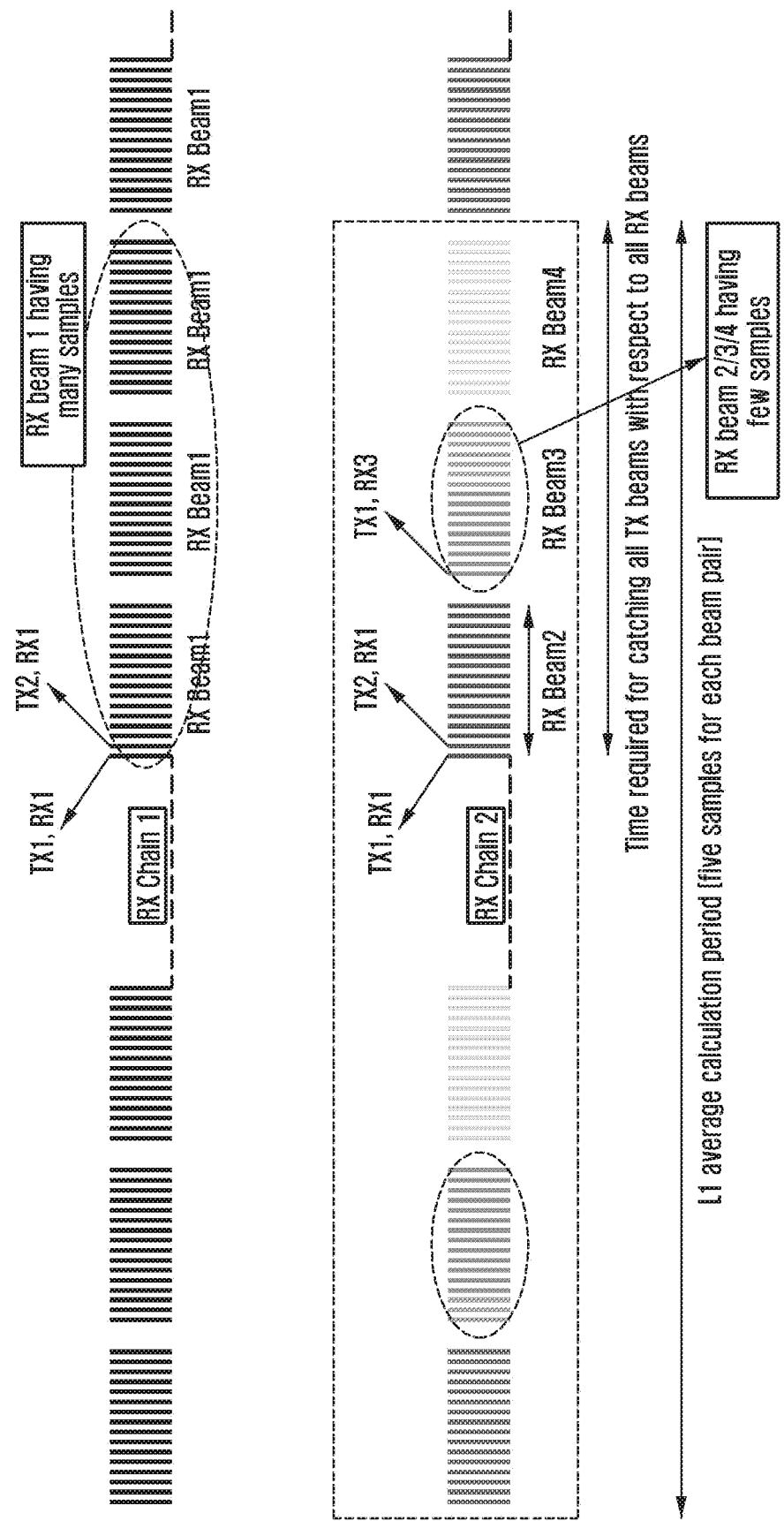
FIG. 4 illustrates a phenomenon in which the different numbers of samples are acquired according to different beams at a sampling time.

This will be described with reference to FIG. 4. FIG. 4 illustrates the different numbers of samples according to different beams during the same sampling time. Referring to FIG. 4, more samples can be acquired in the sampling average calculation time (L1) with respect to RX beam 1 compared to RX beam 2, RX beam 3, and RX beam 4. In FIG. 4, RX beam 1 may acquire three times more samples than beams included in RX chain 2 (RX beam 2, RX beam 3, and RX beam 4). Accordingly, it is required to define a proper standard mechanism to prevent inaccuracy of beam selection due to imbalance of the number of samples in the beam selection.

Further, the following problems need to be solved in the beamforming system. First, a method of determining a cell priority based on beam pairs in the beamforming system is required. The number of beam pairs is a new parameter, which can be used to determine a priority of a cell list measured for cell selection/addition. In the millimeter wave system, when one link is blocked due to link vulnerability, an ongoing service may be stopped. In order to solve the above problem, if a link has a problem, the UE is required to maintain a plurality of links or manage a candidate group of beam pairs in order to easily use another link.

Further, a method of defining a reporting event in the beamforming system is required. Performing the measurement report all the time when the measurement report information is collected is a pressure on the UE and is not efficient in power management. Accordingly, it is required to define a condition for triggering the collected measurement report.

<Embodiment for Solving the Problem of the Number of Samples According to Each Beam>

Figure 5:
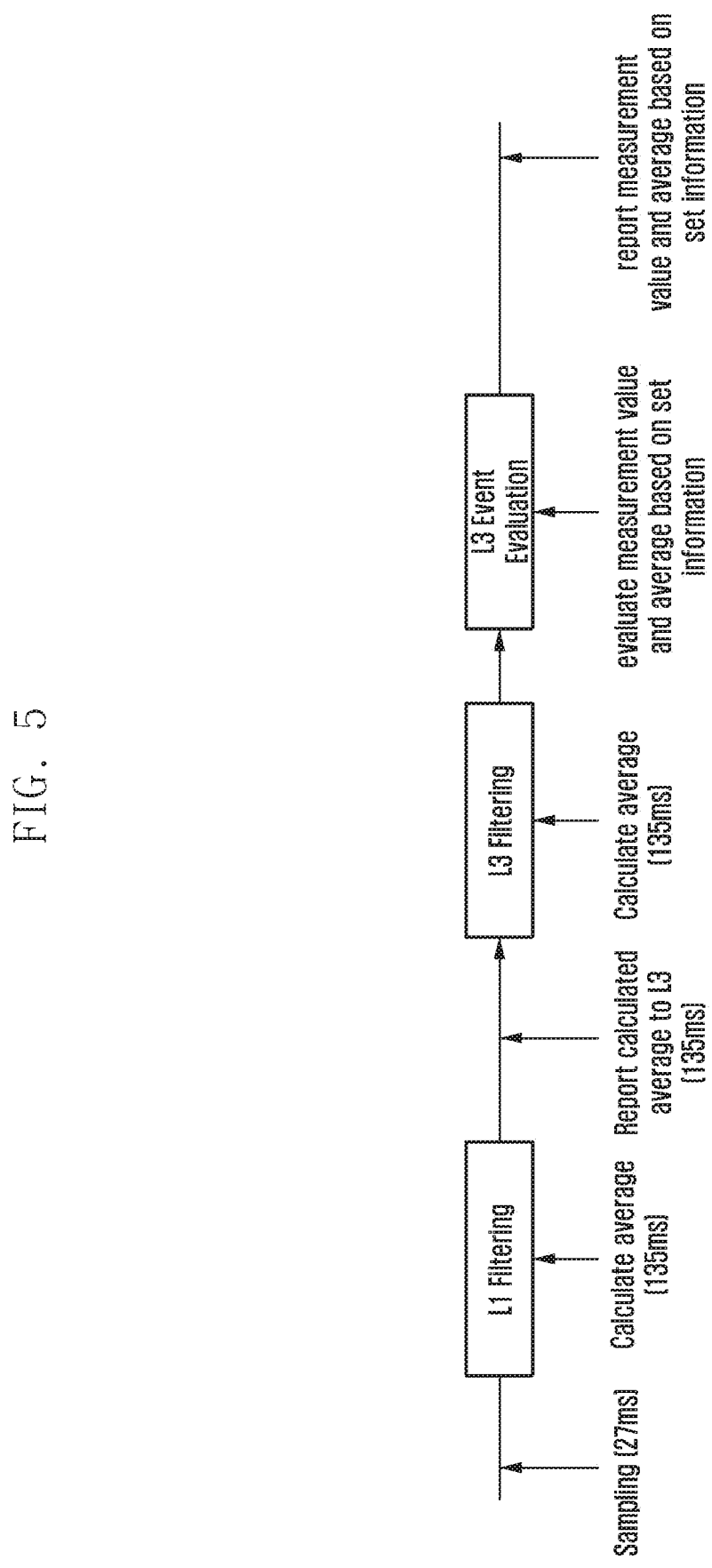
FIG. 5 illustrates a beam state report process according to an embodiment of the present invention.

An embodiment of the present invention uses the following method to solve the problem that the numbers of measurement samples with respect to beam pairs of the cell within the L1 average calculation period (also, referred to as a measurement period) are different. An embodiment of the present invention defines a measurement framework similar to that of a legacy 4G system as a time period for filtering L1 and L3 induced from the number of RX and TX beams in the system. For example, it is assumed that the number of TX beams Ntx is 27 and the number Ntx of RX beams is 9 in FIG. 5. The sampling is performed for one beam pair every 27 ms, and a measurement average may be calculated by 5 samples for one beam pair. In this case, L1 and L3 average calculation periods including five samples with respect to one beam pair are set to 135 ms (in consideration of the frame structure as illustrated in FIG. 2). In L3, a preset threshold and a final filtered value may be compared. Based on a result of the comparison with the threshold, an event such as the measurement report may be selected.

Figure 6:
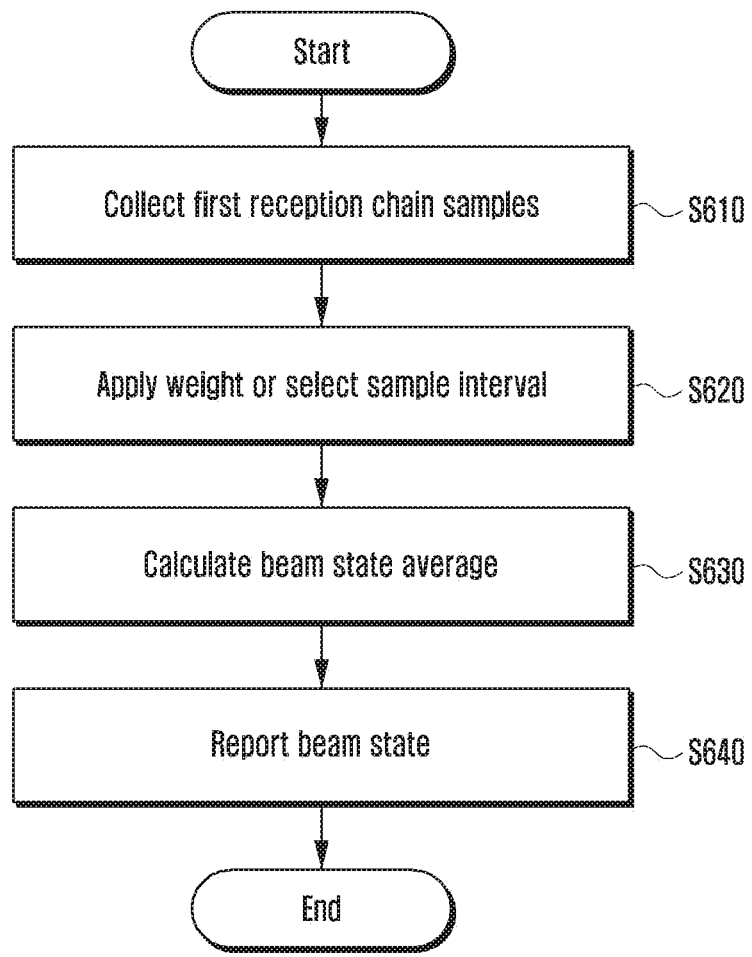
FIG. 6 is a flowchart illustrating a beam state information report method according to an embodiment of the present invention.

FIG. 6 illustrates a method of reporting beam state information according to an embodiment of the present invention. Referring to FIG. 6, in step S610, the UE may collect beam state information on each beam pair of the serving cell and the neighboring cell. Beam state information on a beam pair of each TX beam and each RX beam of the serving cell may be collected by the first reception chain. Beam state information on a beam pair of each TX beam and each RX beam of the second reception serving cell may be collected.

In step S620, in order to solve the other aforementioned problem that the numbers of samples are different, the UE may apply weights to the collected samples or select a sampling interval in which the same number of samples are applied. The weight and sampling interval selection will be described below in more detail.

In step S630, the UE may calculate a beam state average of the samples to which the weights are applied or the samples included in the selected sampling interval.

In step S640, the UE may report the beam state based on the beam state average calculation or an evaluation result.

Hereinafter, the method of solving the number of samples of step S620 will be described in more detail. According to an embodiment of the present invention, in order to standardize samples with respect to all beam pairs, higher weights may be applied to recent samples based on the sampling time. This may be defined as "Recent Preferred Weighted Averaging (RPWA)." A channel variation is higher and more frequent in the millimeter wave. Accordingly, it is required to depend less on values of samples, which have a relatively early sampling time, in the measurement average calculation in order to avoid selecting a non-optimized beam due to old beam samples in the average calculation process. The weight for performing RPWA may be predefined or preset by the network in a broadcast or unicast type.

In one method of the above embodiment, the weight of the sample may be induced based on a weight decline factor "g" predetermined or preset by the network. For example, a weight of a recent sample may be set to 1, a weight of a sample before the recent sample may be set to (1-g), and a weight of a sample before the sample set to (1-g) may be set to (1-g) * (1-g). In another example, the weight may be linearly reduced. In another example, the weight may be exponentially reduced. In another example, a weight of a sample "x" may be explicitly given or predefined by the network. A predefined value, for example, "0" may be used for a sample before the sample "x." In an example, the weight may be set to 1 with respect to samples resulting in the linear average. In this case, the weight is not required to be explicitly defined. Instead, an indication of the linear average may be set by the network. Through such a method, a highest weight may be assigned to a most recently measured sample, and a lowest weight may be assigned to an oldest sample.

Figure 7:
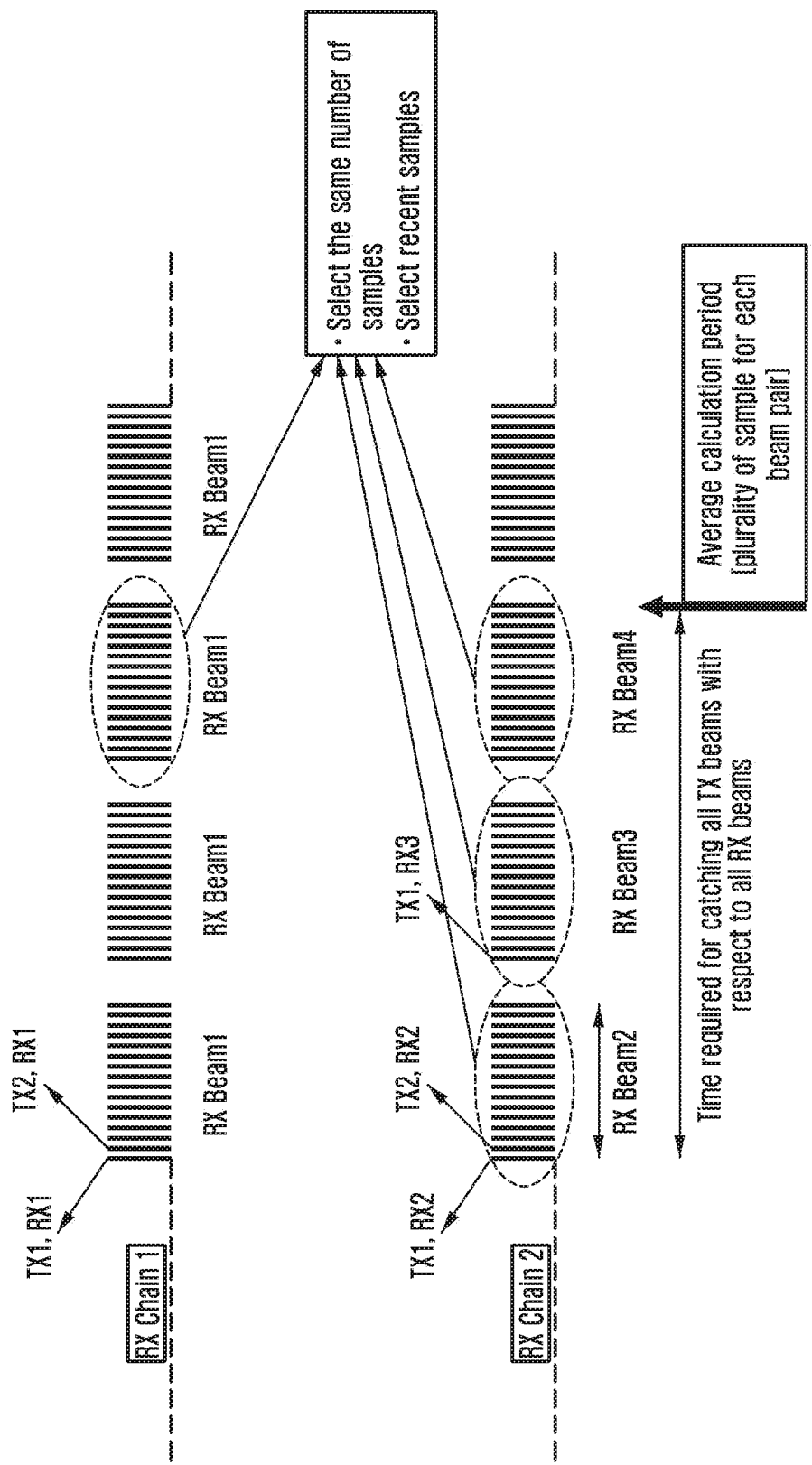
FIG. 7 illustrates a sample selection method according to an embodiment of the present invention.

In another embodiment, averaging considers the same number of samples with respect to each beam pair. The number of samples may be set, predefined, or the same as the minimum number of samples selected with respect to the beam pair in the average calculation period. FIG. 7 illustrates a sample selection method according to an embodiment of the present invention. Selecting some of the collected samples may be equal to selecting a sampling interval in which samples of the collected samples are collected. Referring to FIG. 7, RX beam 1 has three times more samples than other beams during the average calculation period. When the number of available samples with respect to a particular beam is larger than the number of samples of other beams set for the average calculation, the average may be calculated using the same number of samples as that of the samples of the other beams. Meanwhile, when the number of available samples is too large and thus it is required to select samples of other beams, recently acquired samples may be first considered. The number of samples is counted from a time point when the measurement average calculation period ends in a reverse order of the sampling, and the number of samples acquired at a time point when the number of samples becomes the same as the number of samples of another beam may be used. Further, according to the present embodiment, the linear average or the RPWA may be performed.

That is, an embodiment of the present invention proposes two methods to solve the problem that the average is calculated using different numbers of measurement samples according to beams. A first method uses samples acquired during a measurement average calculation period and a weight. In a second method, when the number of samples for a particular beam is large, a sample candidate group for the measurement average calculation, which includes the same number of samples as that of another beam, is selected and the measurement average is calculated for the same samples.

The first method may have three options. A first option may perform Recent Preferred Weighted Averaging (RPWA) for all samples collected for each beam pair. A weight may be applied to the samples for each beam. A high weight may be assigned to a most recently sampled beam sample and a low weight may be assigned to an old sample. Accordingly, the problem occurring due to the different numbers of samples can be solved. For example, the weight may be applied to all samples of FIG. 7 in accordance with a measurement time.

A second option may perform the RPWA only for a beam (for example, a serving beam) having the larger number of samples than other beams, and perform a linear average calculation for other beam pairs. For example, RX beam1 corresponds to a beam which acquires the larger number of samples than other beams in FIG. 7. Accordingly, the RPWA may be performed for RX beam1. The linear average calculation may be performed for the other beams.

A third option may perform the RPWA only for a beam having the larger number of samples than other beams, perform the linear average calculation for other beam pairs, and assign a higher weight to recently measured beams. In FIG. 7, the RPWA may be performed only for beam pairs corresponding to RX beam1, and the linear average may be applied to beam pairs corresponding to other beams (RX beam2, RX beam3, and RX beam4). The weight may be applied to the other beam pairs after applying the linear average. In the application of weights, a lower weight than that of RX beam4 may be applied to the average of beam pairs corresponding to the RX beam3. Accordingly, scaling down may be performed. The average of beam pairs corresponding to RX beam2 may be scaled down from RX beam3.

A second method may apply the same number of samples to all beam pairs during the average calculation period. With respect to each beam pair, recently selected "x" samples may be considered for the average calculation. For example, RX beam1 possesses more samples and the other beams (RX beam2, RX beam3, and RX beam4) acquire fewer samples in FIG. 7. When samples for the measurement average with respect to RX beam1 are selected to perform the average calculation with respect to the same samples, the same number of samples as that of another beam may be selected as samples for the measurement average calculation. When the numbers of samples of other beams are different, samples for the measurement calculation may be selected from each beam such that the numbers of samples of the beams become the same. After the same number of samples is selected from each beam, the RPWA may be performed. A higher weight may be assigned to a recently measured beam. Further, the linear average calculation may be performed.

At this time, the weight may be predefined, or may be configured by the network in a broadcast or unicast type. Meanwhile, the number of samples, which should be considered in the average calculation process, may be predefined, or may be configured by the network in a broadcast or unicast type.

Alternatively, the number of samples, which should be considered in the weight and average calculation process, may be determined by the UE without any aid from the network. In this case, the number of samples may be determined based on present and past channel conditions observed by the UE. For example, the channel conditions may depend on movement of the UE.

<Embodiment of Determining Cell Priority Based on Beam Pair>

According to another embodiment of the present invention, a cell priority may be determined after the average of measurement samples of beam pairs is calculated. Beam pairs having the calculated average measurement value smaller than a threshold may be excluded from the calculation considering a priority. The threshold may be predefined or preconfigured. Since the number of beam pairs is large in a narrow beam width millimeter wave system, not all measurement values of beam pairs need to be reported. Accordingly, after the measurement value calculation, when a particular reference is met, the measurement report may be performed. For example, after a priority is determined based on the measurement value, the measurement report may be performed only for beam pairs having a measurement value, which meets a threshold.

An embodiment of the present invention may provide a method of determining a cell priority based on a beam pair. The cell priority may refer to a priority for selecting a cell, which provides a service to the UE. A neighbor cell may also have the priority. According to an embodiment of the present invention, the priority of the beam pair may be determined based on measurement samples. Further, the priority of each cell is determined based on the number of beam pairs larger than or equal to a threshold. Alternatively, a higher priority may be assigned to a cell having a larger average measurement value of the beam pair. Both the beam pair larger than or equal to the threshold and the measurement average value of the cell may be considered.

Since a link variation is large in millimeter wave channel conditions, determining the priority of the beam pair within the cell may be useful. That is, when there is the link variation in the serving beam, another beam should be selected. Such a situation frequently occurs in the millimeter wave system, so that selecting a cell having the large number of good beams is useful for operations of the UE and the eNB. Further, when a cell is re-selected, selecting a high priority cell based on the priority is advantageous.

Figure 8:
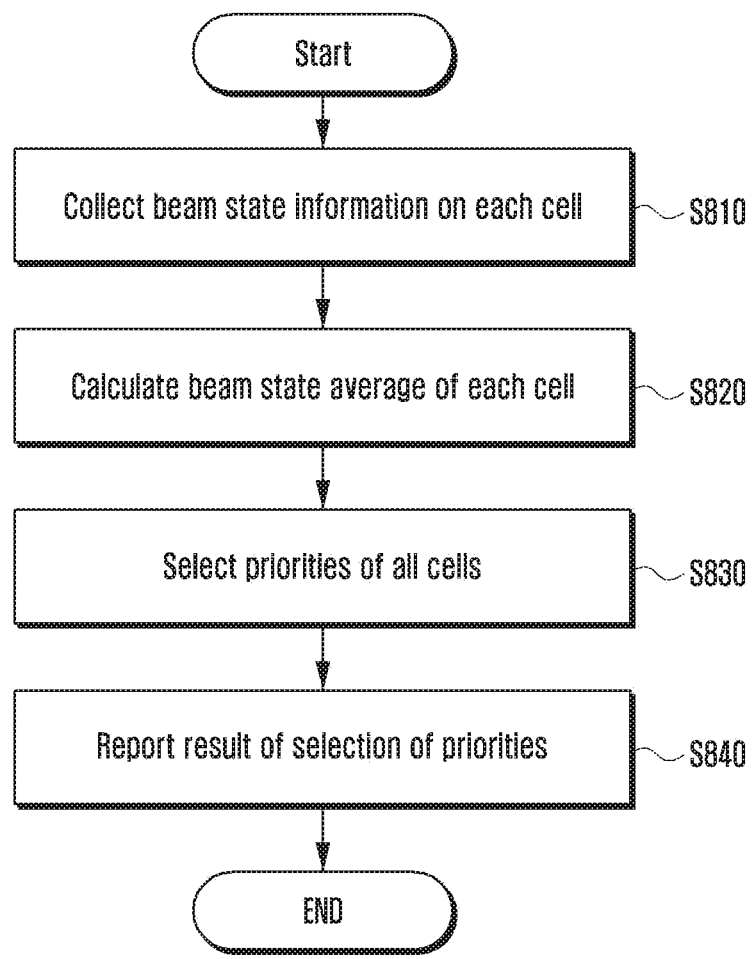
FIG. 8 illustrates a method of determining a cell priority according to an embodiment of the present invention.

FIG. 8 illustrates a method of determining a cell priority according to an embodiment of the present invention. Referring to FIG. 8, in step S810, the UE may collect beam state information on each cell. In step S820, the UE may calculate a beam state average of each cell based on the collected beam state information. Since the collection of the beam state information and the calculation of the beam state average of each cell have been described above, detailed descriptions thereof will be omitted. Meanwhile, in considering the cell priority, when only the number of beams having a beam state larger than or equal to a threshold is considered, step S820 may be omitted.

In step S830, the UE may select priorities of all cells from which beam measurement information has been collected. The UE may select the priority by using beam state measurement information. A detailed method of selecting the priority will be described below.

In step S840, the UE may report a result of the priority selection to the eNB. The eNB having received the result of the priority selection may use the result of the priority selection in replacing a serving cell for the UE or selecting a new serving cell.

A method of determining the cell priority based on the beam state, which corresponds to a detailed operation of step S830, will be described in more detail. In a first method, a higher priority is assigned to a cell having the larger number of beam pairs in a good state. In order to distinguish the beams in the good state, a threshold may be used. With respect to each beam, the channel state measurement value is compared with the threshold. Based on a result of the comparison, beam pairs larger than or equal to the threshold may be counted. The cell priority may be determined according to the number of beam pairs larger than or equal to the threshold based on a result of the count. The priority of each beam within the cell may be also determined.

Figure 9:
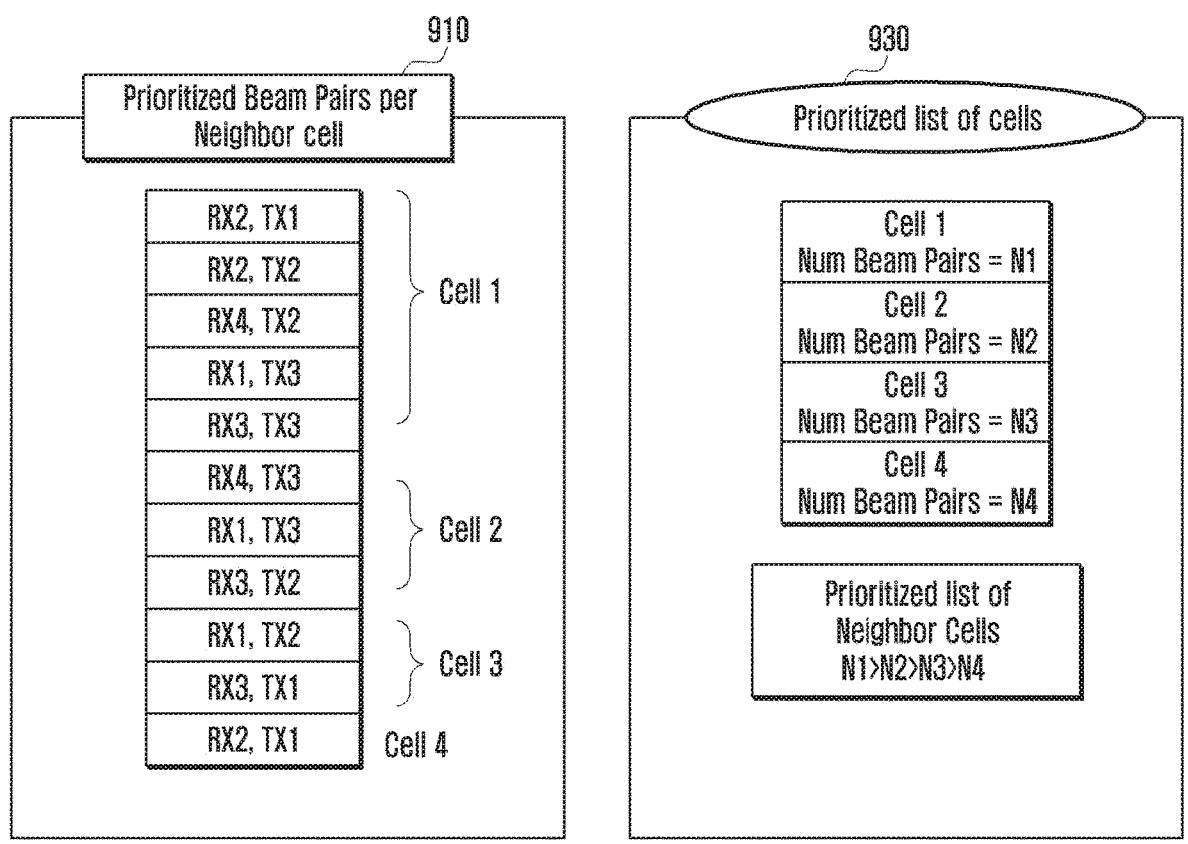
FIG. 9 illustrates prioritized beam pairs per neighbor cell and cell priorities according an embodiment of the present invention.

FIG. 9 illustrates prioritized beam pairs per neighbor cell and cell priorities according an embodiment of the present invention. Referring to FIG. 9, the eNB or the UE may manage a neighbor cell priority beam pair list 910 and a cell priority list 930. First, the neighbor cell priority beam pair list 910 may be a list of a priority of each beam pair per cell. A channel measurement result may be acquired from each beam pair of each cell, and the threshold may be preset. With respect to each beam, the channel state measurement value is compared with the threshold. With respect to each beam pair, a beam pair having a channel state larger than or equal to the threshold may be managed in the neighbor cell priority beam pair list 910. Priorities of beam pairs of other cells may be updated in the neighbor cell priority beam pair list 910.

The cell priority list 930 may be updated based on a result of the update. In the neighbor cell priority beam pair list 910, cell 1 has four beam pairs larger than or equal to a threshold (N1=4), cell 2 has three beam pairs larger than or equal to the threshold (N2=2), cell 3 has two beam pairs larger than or equal to the threshold (N3=2), and cell 4 has one beam pair larger than or equal to the threshold (N4=1). That is, N1>N2>N3>N4. The cell priority list 930 may be updated based on the number of beam pairs. Cell 1, which has the largest number of beam pairs in the range larger than or equal to the threshold, has the highest priority in the neighbor cell list. When the current serving cell has a link problem, cell 1, which has the largest number of beam pairs having a good channel state, may be selected the serving cell based on the priority.

Additionally, the cell priority may be determined based on priorities of beam pairs of TX beams for a particular RX beam per cell without the use of measurement results of beam pairs for all RX beams. In this case, the UE has the advantage of selecting a cell having the large number of beams in the best state with respect to the current RX beam while maintaining the currently used RX beam. Further, since the UE is not required to measure beams other than the current serving RX beam, complexity and power consumption can be reduced.

Meanwhile, the first method is based on only the number of beam pairs having the good state in the cell, and thus cannot guarantee an entire cell measurement average, which is better than those of other cells. Accordingly, the second method suggests using the measurement average for all beam pairs of each cell, rather than using the number of beam pairs larger than or equal to the threshold when determining the cell priority.

According to an embodiment of the second method, an average of beam pairs within each cell may be calculated, and the cell priority may be determined based on the calculated average. Rather than all beam pairs within each cell, only the beam pairs within the cell, which are larger than or equal to a threshold may be used to calculate the average, and then priorities of cells may be determined based on the average of the beam pairs.

Figure 10:
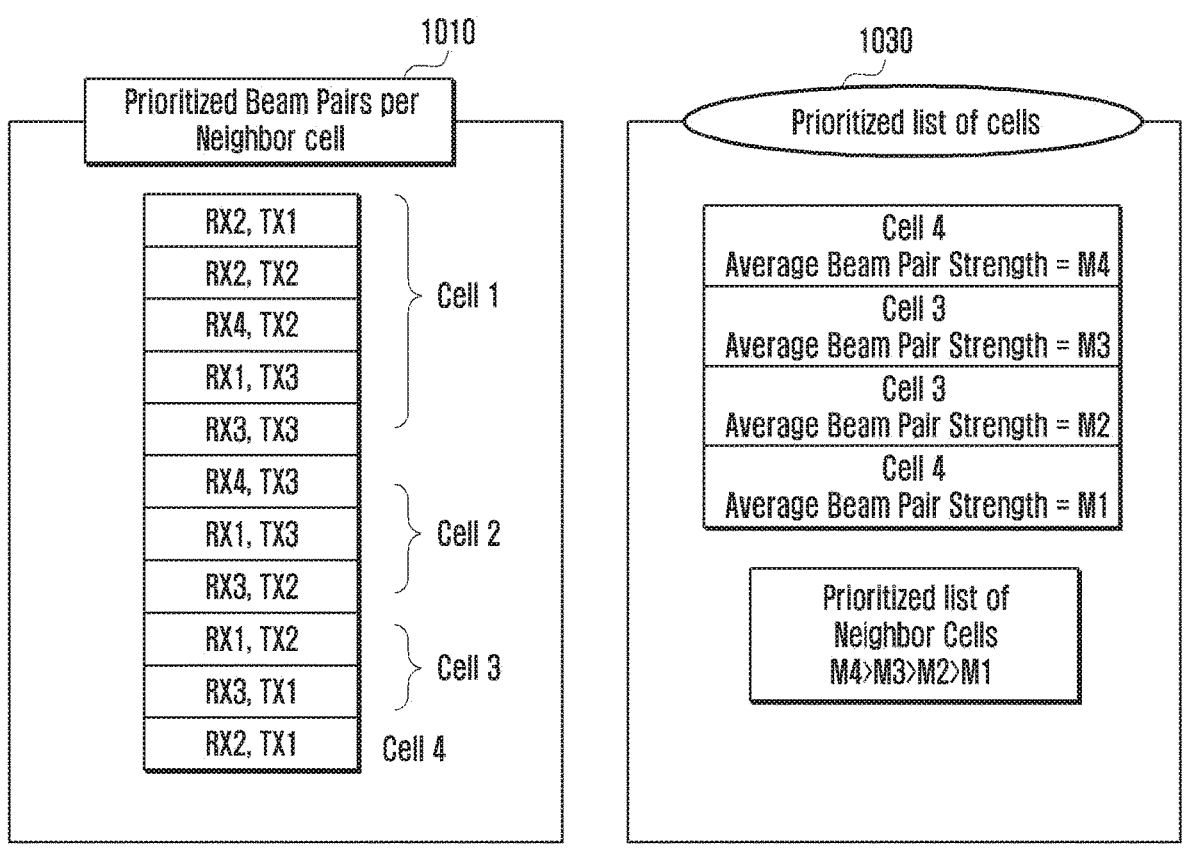
FIG. 10 illustrates a method of determining a cell priority based on an average of beam pairs larger than or equal to a threshold.
Figure 11:
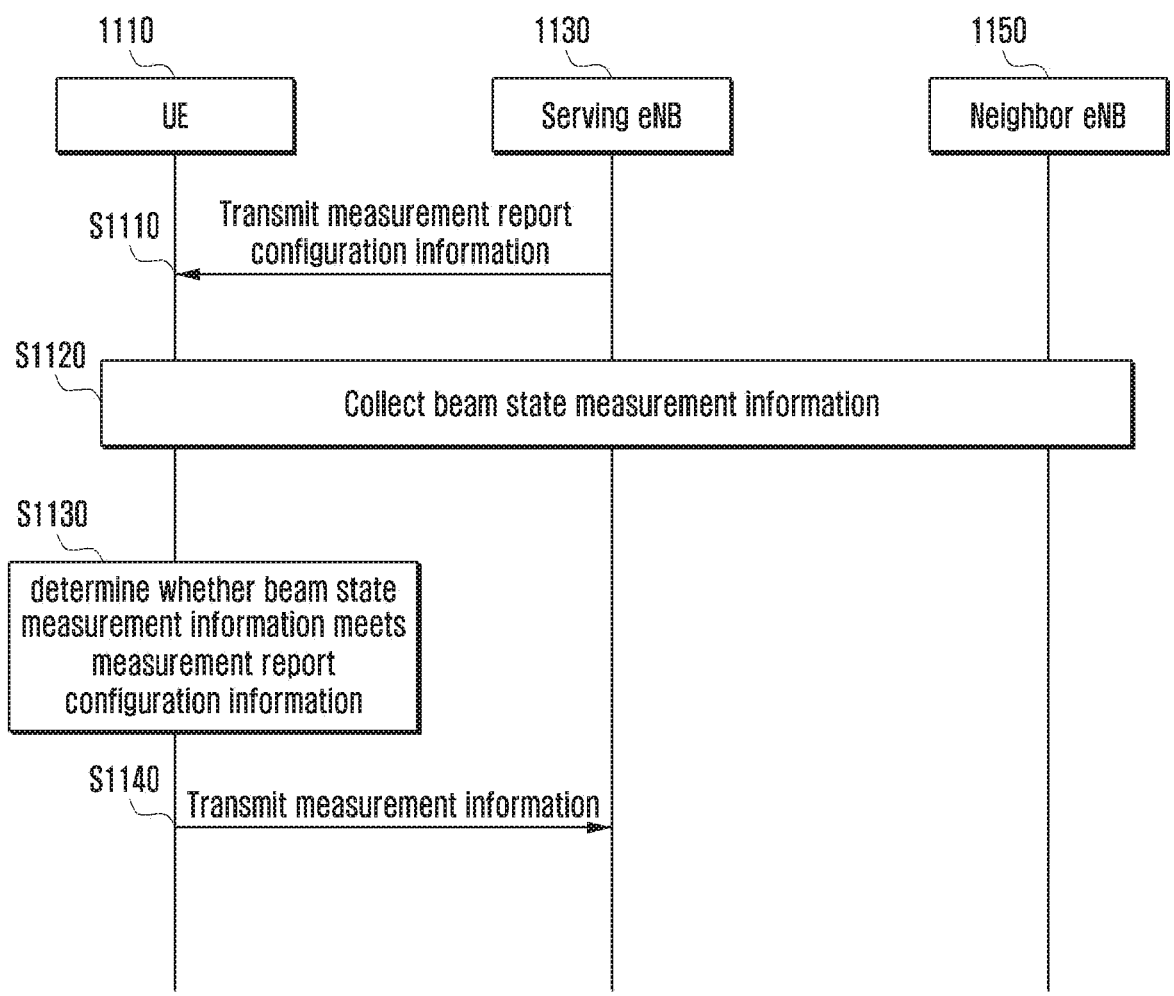
FIG. 11 illustrates a beam state measurement report procedure according to an embodiment of the present invention.

FIG. 10 illustrates a method of determining a cell priority based on an average of beam pairs larger than or equal to a threshold. Referring to FIG. 10, the neighbor cell priority beam pair list is the same as that described in FIG. 9. For example, cell 1 has four beam pairs, which have an average M1 and are larger than or equal to the threshold, and cell 2 has two beam pairs, which have an average M2 and are larger than or equal to the threshold. When M2>M1, cell 2 has a higher priority than cell 1. When beam pair 1 of cell 3 has an average sample value s1 and beam pair 2 of cell 3 has an average sample value s2, an average measurement value of cell 3 is (s1+s2)/2. In FIG. 8, it is assumed that M4>M3>M2>M1. Accordingly, cell 4, which has the highest beam pair channel state average, has the highest priority, and cell 1, which has the largest number of beam pairs larger than or equal to the threshold, has the lowest beam pair channel state average and thus has the lowest priority.

Meanwhile, when the cell priority is determined based on the measurement average, the average may be calculated using the preset number of beam pairs. For example, when the number of beam pairs is N and only three beam pairs are considered for the average calculation process, only the preset number of beams among the N beam pairs may be used to acquire the average measurement value per cell. At this time, a beam pair, which has a high measurement value, among a plurality of beam pairs used for the average value may be first selected and used.

A third method may consider both the number of beam pairs larger than or equal to the threshold and the measurement average. Cells having the number of beam pairs, which is larger than a preset or predefined number of beam pairs larger than or equal to the threshold, may be determined as a first set. Cells having the number of beam pairs, which is smaller than or equal to the preset number of beam pairs larger than or equal to the threshold, may be determined as a second set. The cells determined as the first set may be prioritized based on the number of beam pairs. The cells determined as the second set may be prioritized based on the average of beam pairs within the cell. The cells included in the first set may have a higher priority than the cells included in the second set. For example, it is assumed that cell 1 has five beam pairs larger than or equal to the threshold, cell 2 has three beam pairs larger than or equal to the threshold, cell 3 has two beam pairs larger than or equal to the threshold, and cell 4 has one beam pair larger than or equal to the threshold. For example, when it is assumed that the number of beam pairs set to determine whether the cell is included in the first set is 3, cell 1 and cell 2 are included in the first set, and cell 3 and cell 4 are included in the second set. In this case, although the measurement averages of beam pairs within cell 3 and cell 4 are larger than the measurement averages of cell 1 and cell 2, cell 1 and cell 2 included in the first set have a higher priority than cell 3 and cell 4 included in the second set.

In a fourth method, according to an embodiment of the present invention, the remaining beam pairs may be prioritized within the corresponding cell later. Thereafter, the priority of each cell is determined based on the number of beam pairs larger than or equal to the threshold. Subsequently, the cells are re-arranged, and cells having a difference in an average of received signal intensities of beam pairs larger than or equal to the threshold and a difference in the number of beam pairs smaller than the threshold are prioritized. Such a procedure is repeated until priorities of all lists are determined. This has an advantage in a situation where the cell has a smaller number of beam pairs but has a higher average rather than a situation where the cell has a larger number of beam pairs but has a lower average.

In a fifth method, according to another embodiment of the present invention, the priorities of the cells are determined based on the number of beam pairs larger than or equal to the threshold or dynamically determined based on the average number of beam pairs within the cell. The UE may select a reference for the determination of the priorities according to channel conditions, mobility, recent histories, or a combination of one or more thereof. For example, with respect to the UE, which moves quickly, the channel conditions change more quickly, so that it is more important for the UE, which moves quickly, to have one or more good beams from the serving cell. Accordingly, the UE, which moves quickly, may select the reference based on the number of beam pairs larger than or equal to the threshold.

According to an embodiment, the threshold appropriate for the reference may be configured by the network to allow the UE to properly select the reference. For example, the network may use the reference of the average of beam pairs to determine the priorities when the UE moves at a low speed, and may use the reference of the number of beam pairs larger than or equal to the threshold when the UE moves at a high speed. Alternatively, according to another embodiment, when the UE determines that a beam variation rate is high, the UE may use the reference of the number of beam pairs larger than or equal to the threshold. When the UE determines that the beam variation rate is low, the UE may use the reference of the beam pair average to determine the priorities.

As described above, in order to determine priorities of cells based on measurement results of beam pairs, the number of beam pairs larger than or equal to the threshold and the average of beam pairs within the cell may be used. Further, both the number of beam pairs and the average may be considered together. Additionally, it may be determined which one between the number of beam pairs and the average is preferentially selected, based on channel conditions, mobility, or recent histories of the UE. Such various thresholds may be predefined or preset by the network.

<Embodiment for Defining Reporting Event in Beamforming System>

According to an embodiment of the present invention, a new reporting event is defined in the beamforming system. In a first type, an event for triggering a measurement report to a neighbor cell when a state of the serving cell is not good may be defined. According to an embodiment of the present invention, with respect to the serving cell or the neighbor cell, the measurement report to the neighbor cell is not triggered until a particular condition related to beams of each cell is met. This is to efficiently manage power of the UE by not performing switching on a second RX chain (RX chain for the neighbor cell) when the serving cell or the neighbor cell does not meet the particular condition in the beamforming system using a double RX chain.

In the first type, when the number of beams having the good state in the serving cell is smaller than a preset number or when the measurement average of the serving cell is smaller than a preset threshold, the measurement report may be triggered.

In a second type, an event for triggering the measurement report when the state of the neighbor cell is good may be defined. In the second type, when the number of beams having the good state in the neighbor cell is larger than or equal to a preset number or when the measurement average of the neighbor cell is larger than or equal to a preset threshold, the measurement report may be triggered.

In a third type, an event for triggering the measurement report when the state of the neighbor cell is relatively better than the state of the serving cell may be defined. The third type uses a relative relationship between the neighbor cell and the serving cell. When the number of beams having the good state in the neighbor cell is larger than the number of beams having the good state in the serving cell or when the measurement average of the neighbor cell is larger than or equal to the measurement average of the serving cell, the measurement report t may be triggered.

An embodiment of the present invention will be described in more detail with reference to FIG. 10. FIG. 10 illustrates a beam state measurement report procedure according to an embodiment of the present invention. Referring to FIG. 10, the beamforming system may include a UE 1110, a serving eNB 1130, and at least one neighbor eNB 1150. A serving cell and a serving eNB may be used as the same meaning. The neighbor eNB may be used as the same meaning as that of the neighbor cell.

In step S1110, the serving eNB 1130 may transmit measurement report configuration information to the UE 1110. The measurement report configuration information may include first type, second type, and third type measurement report trigger condition information. The measurement report trigger condition may include a first condition, a second condition, a third condition, and a fourth condition. The first condition may be a condition of triggering a measurement report when the number of beam pairs having the beam state measurement value of the serving cell 1130, which is larger than or equal to a first threshold, is smaller than a preset number. The second condition may be a condition of triggering a measurement report of the neighbor cell 1150 when the beam state measurement average of the serving cell 1130 is smaller than a second threshold. The third condition may be a condition of triggering a measurement report of the neighbor cell when the number of beam pairs having the beam state measurement value of the neighbor cell 1150, which is larger than or equal to a third threshold, is larger than or equal to a preset number. The fourth condition may be a condition of triggering a measurement report of the neighbor cell 1150 when the beam state measurement average of the neighbor cell 1150 is larger than or equal to a fourth threshold. The first threshold and the third threshold may be the same. The second threshold and the fourth threshold may be the same.

In step S1120, the UE 1110 may measure the beam state of the beam pair of the neighbor cell 1150. The UE 1110 may measure beam state of all RX beams which can be received and all TX beams of the neighbor cell. The measurement for the neighbor cell 1150 may be periodically performed, or may be aperiodically performed through reception of an instruction from the serving eNB 1130. The beam measurement for the serving cell 1130 may be also performed. Before the measurement report trigger condition is received, the measurement for the neighbor cell 1150 may be performed.

In step S1130, the UE 1110 may determine whether the serving cell 1130 or the neighbor cell 1150 meets the measurement report trigger condition based on a result of the measurement. When the number of beam pairs of the serving cell 1130, which meet the first threshold, is smaller than a preset number, it may be determined that the trigger condition is met. When the beam state measurement average of the serving cell 1130 is smaller than the second threshold, it may be determined that the trigger condition is met. When the number of beam pairs of the neighbor cell 1150, which meet the third threshold, is larger than or equal a preset number, it may be determined that the trigger condition is met. When the beam state measurement average of the neighbor cell 1150 is larger than or equal to the fourth threshold, it may be determined that the trigger condition is met. Further, when the number of beams having a good state (beam pairs having the beam state measurement value larger than or equal to the third threshold) of the neighbor cell 1150 is larger than the number of beams having a good state (beam pairs having the beam state measurement value larger than or equal to the first threshold) of the serving cell 1130, or when the measurement average of the neighbor cell 1150 is larger than or equal to the measurement average of the serving cell 1130, it may be determined that the trigger condition is met.

When it is determined that the measurement report trigger condition is met in the previous step, the UE 1110 may perform the measurement report in step S1140. The UE 1110 may perform the measurement report of the neighbor cell 1150. The measurement report may be the beam state measurement report. When it is determined that the measurement report trigger condition is not met in the previous step, the UE 1110 does not perform the measurement report of the neighbor cell 1150. The measurement report may include recent measurement results of beam pairs of the neighbor cell 1150. The measurement result may indicate a not good beam state of the serving cell 1130. Further, the measurement result may indicate that the beam channel state of the current neighbor cell 1150 is better than the beam channel state of the serving cell. Moreover, the measurement result may indicate that the neighbor cell 1150 has the larger number of beam pairs having a good channel state than the serving cell 1130. Furthermore, the measurement report may indicate that the neighbor cell 1150 has a higher measurement state average than the serving cell 1130.

The serving eNB 1130 may receive the measurement report from the UE. The serving eNB 1130 may select a new serving eNB of the UE based on a result of the measurement report. Further, the measurement report may be used to determine a serving beam in the new serving eNB.

Figure 12:
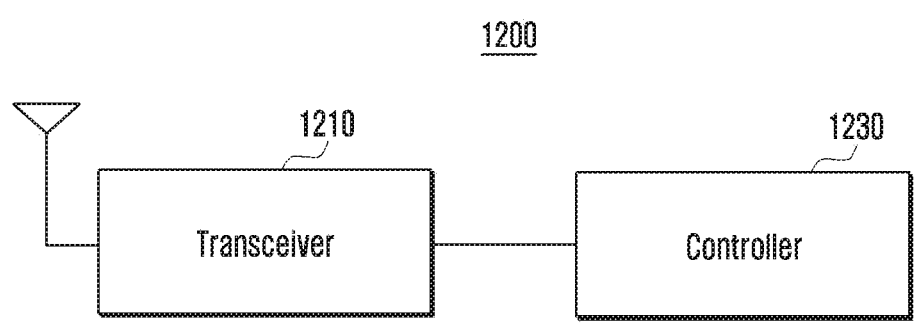
FIG. 12 is a block diagram illustrating a UE according to an embodiment of the present invention.

FIG. 12 is a block diagram illustrating a UE according to an embodiment of the present invention. Referring to FIG. 12, a UE 1200 may include a transceiver 1210 and a controller 1230. The controller 1230 may include at least one processor. The transceiver 1210 may perform communication with at least one network node. The controller 1230 may control a general operation of the UE.

The controller 1230 may make a control to measure beam state information by using a first RX chain and a second RX chain, control the beam state information on the first RX chain to correspond to the beam state information on the second RX chain, calculate state information on each beam based on the beam state information on the first RX chain and the beam state information on the second RX chain, and report state information on at least one beam. At this time, the first reception chain may be a chain for collecting a beam state of a serving reception beam, and the second reception chain may be a chain for collecting beam state of other reception beams except for the serving reception beam.

The controller 1230 may make a control to measure beam state information on beams of at least one serving cell and beams of at least one neighbor cell, adjust beam state information on at least one measured beam for normalizing the beam state information on the measured beam, calculate state information on each beam based on the adjusted beam state information and report state information on one or more beams.

The controller 1230 may make a control to adjust the beam state information on the second reception chain by assigning weights to the samples of the beam state information collected through a reception beam of the terminal. The recently collected samples of a beam are assigned higher weight value as compared to other collected samples of the same beam that are considered for normalization. The weight can be configured by the network to the UE in broadcast or unicast manner. The weight can be pre-specified.

The controller 1230 may make a control to adjust the number of samples of the beam state information collected through the first reception chain to be equal to the number of samples of the beam state information collected through one reception beam of the second reception chain. The considered beam samples of the serving reception beam are the recent most samples corresponding to the said number of samples. The considered beam samples of the serving reception beam are the samples in time that correspond to the considered samples of the reception beam with the exception of the serving reception beam. The controller 1230 may make a control to apply a weight to a sample of a recently collected reception beam among the samples of the beam state information collected through each reception beam of the second reception chain.

The controller 1230 may make a control to measure beam state information on a neighboring cell, and determine a priority of the neighboring cell based on the beam state information. At this time, the priority may be determined based on a parameter for the number of beam pairs corresponding to a cell having channel state information larger than or equal to a preset threshold or a parameter for beam state average information on each neighboring cell. The priority is determined based on the average sample measurement value across all beams corresponding to a cell. The priority is determined based on number of beam pairs corresponding to a cell and on the average sample measurement value across all beams corresponding to a cell.

The controller 1230 may make a control to select the parameter used for determining the priority from the parameters based on a channel condition, mobility of the UE, and recent history information on the UE.

The controller 1230 may make a control to report the beam state information on the neighboring cell based on information on the number of beam pairs of the serving cell, which has beam state information equal to or smaller than a preset first threshold, or information on the number of beam pairs of the neighbor cell, which has beam state information larger than or equal to a preset second threshold. The reporting the beam state information on the neighboring cells further correspond to reporting only a preset number of beam state information among the list of prioritized beams.

Although it has been described that the configuration of the UE 1200 is divided into the transceiver 1210 and the controller 1230, this is only an embodiment and the configuration of the UE 1200 is not necessarily limited thereto. Further, although the function and operation of the UE 1200 have been described, the function and operation of the UE is not limited to the description of FIG. 12 and the function and operation described in FIGS. 1 to 11 according to the present invention may be performed.

Figure 13:
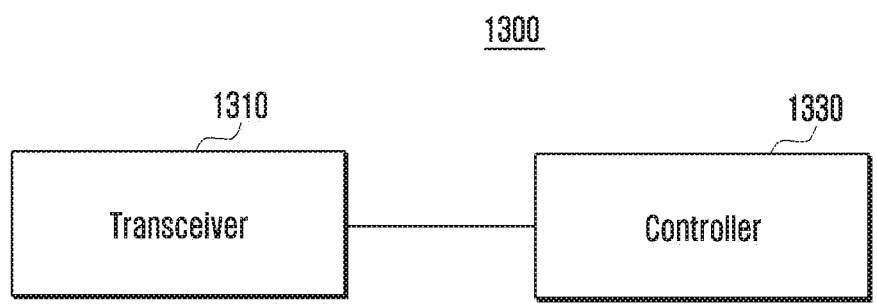
FIG. 13 is a block diagram illustrating an eNB according to an embodiment of the present invention.

FIG. 13 is a block diagram illustrating an eNB according to an embodiment of the present invention. Referring to FIG. 13, an eNB 1300 may include a transceiver 1310 and a controller 1330. The controller 1330 may include at least one processor. The transceiver 1310 may perform communication with at least one network node. The controller 1330 may control a general operation of the eNB. According to an embodiment of the present invention, the eNB 1300 may transmit configuration information to allow the UE to perform the operations illustrated in FIGS. 1 to 12. The configuration information may be beam state information report configuration information.

The controller 1330 may make a control to transmit beam state information report configuration information to at least one UE and to receive beam state information from the UE based on the beam state information report configuration information. At this time, the beam state information may be determined based on information generated by adjusting the beam state information measured using the first RX chain and the second RX chain to correspond to the beam state information on the second RX chain by the UE. Further, the first RX chain may be a chain for collecting a beam state of a serving reception beam, and the second reception chain may be a chain for collecting beam state of other reception beams except for the serving reception beam among the RX beams of the UE.

The controller 1330 may make a control to transmit beam state information report configuration information to a terminal and receive beam state information from the terminal based on the beam state information report configuration information. The beam state information is determined based on information, which is generated by adjusting the beam state information measured by the terminal for normalizing.

The beam state report configuration information may include information, which is configured to determine the beam state information by assigning weights to recently collected samples among samples of the beam state information collected through the first reception chain or determine the beam state information by adjusting the number of samples of the beam state information collected through the first reception chain to be equal to the number of samples of the beam state information collected through one reception beam of the second reception chain.

The controller 1330 may make a control to receive priority information on neighbor cells from the UE. At this time, the beam state information report configuration information may include information, which determines the priorities based on a parameter for the number of beam pairs having channel state information larger than or equal to a preset threshold of the UE or a parameter for beam state average information on each neighboring cell. The beam state information report configuration information may include information, which is configured to report the beam state information on the neighboring cell based on information on the number of beam pairs of the serving cell, which has beam state information equal to or smaller than a preset first threshold, or information on the number of beam pairs of the neighbor cell, which has beam state information larger than or equal to a preset second threshold.

Although it has been described that the configuration of the eNB 1300 is divided into the transceiver 1310 and the controller 1330, this is only an embodiment and the configuration of the eNB 1300 is not necessarily limited thereto. Further, although the function and operation of the eNB 1300 have been described, the function and operation of the eNB are not limited to the description of FIG. 13 and the functions and operations described in FIGS. 1 to 12 according to the present invention may be performed.

The embodiments disclosed in the present specifications and drawings were provided merely to readily describe and to help a thorough understanding of the present invention but not intended to limit the scope of the present invention. Therefore, it should be construed that, in addition to the embodiments disclosed herein, all modifications and changes or modified and changed forms derived from the technical idea of the present disclosure fall within the scope of the present disclosure.

The invention claimed is:

1. A method performed by a terminal in a wireless communication system, the method comprising:
   receiving, from a base station, first information associated with a number of measurement samples to be averaged;
   obtaining measurement samples by measuring signals of a plurality of beams;
   deriving a measurement result based on the measurement samples and the number of measurement samples to be averaged; and
   transmitting, to the base station, the measurement result to the base station.

2. The method of claim 1,
   wherein the number of the measurement samples is determined based on the first information configured by a unicast signaling.

3. The method of claim 1,
   wherein a total number of the measurement samples used for the measurement result is equal to or less than the number of the measurement samples.

4. The method of claim 1,
   wherein measurement samples which are larger than or equal to a threshold are used to calculate an average for the measurement result.

5. The method of claim 1,
   wherein a report of the measurement result is triggered based on a threshold value for a measurement report.

6. A terminal in a wireless communication system, the terminal comprising:
   a transceiver; and
   a controller configured to:
      receive, from a base station via the transceiver, first information associated with a number of measurement samples to be averaged,
      obtain measurement samples by measuring signals of a plurality of beams,
      derive a measurement result based on the measurement samples and the number of measurement samples to be averaged, and
      transmit, to the base station via the transceiver, the measurement result to the base station.

7. The terminal of claim 6,
   wherein the number of the measurement samples is determined based on the first information configured by a unicast signaling.

8. The terminal of claim 6,
   wherein a total number of the measurement samples used for the measurement result is equal to or less than the number of the measurement samples.

9. The terminal of claim 6,
   wherein measurement samples which are larger than or equal to a threshold are used to calculate an average for the measurement result.

10. The terminal of claim 6,
    wherein a report of the measurement result is triggered based on a threshold value for a measurement report.

11. A method performed by a base station in a wireless communication system, the method comprising:
    transmitting, to a terminal, first information associated with a number of measurement samples to be averaged; and
    receiving, from the terminal, a measurement result which is derived based on a plurality of measurement samples and the number of measurement samples to be averaged.

12. The method of claim 11, wherein the number of the measurement samples is determined based on the first information configured by a unicast signaling.

13. The method of claim 11,
    wherein a total number of the plurality of measurement samples used for the measurement result is equal to or less than the number of the measurement samples.

14. The method of claim 11,
    wherein measurement samples which are larger than or equal to a threshold are used to calculate an average for the measurement result.

15. The method of claim 11,
    wherein a report of the measurement result is triggered based on a threshold value for a measurement report.

16. A base station in a wireless communication system, the base station comprising:
- a transceiver; and
- a controller configured to:
    - transmit, to a terminal via the transceiver, first information associated with a number of measurement samples to be averaged, and
    - receive, from the terminal via the transceiver, a measurement result which is derived based on a plurality of measurement samples and the number of measurement samples to be averaged.

17. The base station of claim 16, wherein the number of the measurement samples is determined based on the first information configured by a unicast signaling.

18. The base station of claim 16,
- wherein a total number of the plurality of measurement samples used for the measurement result is equal to or less than the number of the measurement samples.

19. The base station of claim 16,
- wherein measurement samples which are larger than or equal to a threshold are used to calculate an average for the measurement result.

20. The base station of claim 16,
- wherein a report of the measurement result is triggered based on a threshold value for a measurement report.

* * * * *